US007093283B1

(12) United States Patent
Chen et al.

(10) Patent No.: US 7,093,283 B1
(45) Date of Patent: Aug. 15, 2006

(54) METHOD AND APPARATUS FOR DEPLOYING CONFIGURATION INSTRUCTIONS TO SECURITY DEVICES IN ORDER TO IMPLEMENT A SECURITY POLICY ON A NETWORK

(75) Inventors: Shigang Chen, Santa Clara, CA (US); Partha Bhattacharya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 10/078,061

(22) Filed: Feb. 15, 2002

(51) Int. Cl.
*G06F 21/00* (2006.01)
(52) U.S. Cl. .............................. 726/6; 726/12; 709/242
(58) Field of Classification Search ................ 713/153; 726/13, 14, 11, 6, 3, 12; 709/242
See application file for complete search history.

(56) References Cited

U.S. PATENT DOCUMENTS 6,678,827 B1 * 1/2004 Rothermel et al. ............ 726/6
6,678,835 B1 * 1/2004 Shah et al. ..................... 714/4

OTHER PUBLICATIONS

K. Egevang, et al., Network Working Group, Request for Comments: 1631, Category: Informational, "The IP Network Address Translator (NAT)," [online], May 1994,[retrieved on Mar. 7, 2005]. Retrieved from the internet: <URL: http://www.ietf.org/rfc1631.txt> pp. 1-10.

P. Srisuresh, et al., Network Working Group, Request for Comments: 3022, Obsoletes: 1631, Category: Informational, "Traditional IP Network Address Translator (Traditional NAT),"[online] Jan. 2001, [retrieved on Mar. 7, 2005]. Retrieved from the internet: <URL http://ww.ietf.org/rfc/rfc3022.txt> pp. 1-15.

R. Atkinson, et al., Network Working Group, Request for Comments: 1825, Category: Standards Track, "Security architecture for the Internet Protocol," [online] Aug. 1995, [retrieved on Mar. 7, 2005] Retrieved from the internet:<URL http://www.ietf.org/rfc/rfc1825.txt>, pp. 1-21.

(Continued)

*Primary Examiner*—Jacques H. Louis-Jacques
*Assistant Examiner*—Ellen C Tran
(74) *Attorney, Agent, or Firm*—Hickman Palermo Truong & Becker LLP

(57) ABSTRACT

A method and apparatus for deploying configuration instructions to security devices in order to implement a security policy on a network are disclosed. An address translation alteration performed on packets communicated between a management source and a plurality of security devices, resulting from implementation of a proposed new network security policy, is detected. One or more sets of security devices are identified that would each have one or more configuration dependencies as a result of the address translation alteration. Configuration instructions are sent from the management source to each of the one or more sets of security devices using an order determined by the identified configuration dependencies. The configuration instructions are used to implement the security policy on the network. As a result, firewalls and similar devices are properly configured for a new policy without inadvertently causing traffic blockages arising from configuration dependencies.

28 Claims, 7 Drawing Sheets

OTHER PUBLICATIONS

S. Kent, et al., BBN Corp., Network Working Group, Request for Comments: 2401, Obsoletes: 1825, Category: Standards Track, "Security Architecture for the Internet Protocol, [online] Nov. 1998, [retrieved on Mar. 7, 2005]" Retrieved from the internet: <URL http://www.ietf.org/rfc/rfc2401.txt> pp. 1-58.

* cited by examiner

US 7,093,283 B1

METHOD AND APPARATUS FOR DEPLOYING CONFIGURATION INSTRUCTIONS TO SECURITY DEVICES IN ORDER TO IMPLEMENT A SECURITY POLICY ON A NETWORK

FIELD OF THE INVENTION

The present invention generally relates to configuring security devices on a network. The invention relates more specifically to a method and apparatus for deploying configuration instructions to security devices in order to implement a security policy on a network.

BACKGROUND OF THE INVENTION

Network management systems implement policies by configuring managed devices in the network, such as routers, switches, gateways, and firewalls, with instructions appropriate to carry out a desired policy. One general application for a network management system is implementation of a security policy on firewalls and other security devices. A policy server may be used in conjunction with other components to configure security devices on the network with security policies. CISCO SECURE POLICY MANAGER (CSPM), manufactured by CISCO SYSTEMS, INC., San Jose, Calif., is a commercially available product for implementing security policies using a policy server.

Network management systems are increasingly required to manage larger networks that have numerous firewalls, virtual private networks, and other security devices. To implement security policies properly, an administrator must configure all such devices properly. Consequently, security management can become a difficult task on large networks. A centralized management scheme is often employed for large networks because such systems are efficient, and retain all security information and configurations in one location. In addition, centralized management schemes reduce the possibility of inconsistent or incompatible configurations for different security devices.

With centralized management schemes, security policy configurations are typically deployed from a management site to many security devices using telnet or file transfer protocol, in clear packet traffic or via encrypted tunnel (e.g. IPSec). The use of centralized management stations in this manner requires firewalls and other security devices to always be open. This use of a centralized management station is typically referred to as a permit management property.

Often, networks use a string of security devices in series. The management host maintains all channels between the security devices open for any new set of configurations that it generates.

When address translation mechanisms are used in centralized management schemes, the order in which security devices become configured determines whether deployment of a set of configurations to multiple security devices will be successfully implemented. Even if the new configurations for the security policy satisfy the permit management property, some management channels may be blocked in the middle of deployment because some security devices have been configured while others have not. When a mixture of new and old configurations result, the management channels that are blocked during the transition can prevent some firewalls from receiving their new configurations. Consequently, the entire network goes into a partially configured state with unpredictable security behavior.

Furthermore, because some management channels are blocked, it becomes more difficult to roll-back security devices to their original state. This can lead to security leaks or service disruptions for an extended period of time.

Based on the foregoing, there is a need for determining the order in which a new set of configurations for security devices on a network can be deployed so that newly deployed configurations do not block other configurations that are being deployed when implementing a new security policy.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in some aspects, a method, system and device that deploys configuration instructions to a plurality of security devices for the purpose of implementing a security policy on a network.

According to one embodiment, implementation of a security policy is detected as causing an address translation alteration between a management source and a plurality of security devices. One or more sets of security devices are identified that each have one or more configuration dependencies as a result of the address translation alteration. Configuration instructions are sent from the management source to each of the one or more sets of security devices using an order determined by the identified configuration dependencies. The configuration instructions are used to implement the security policy on the network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
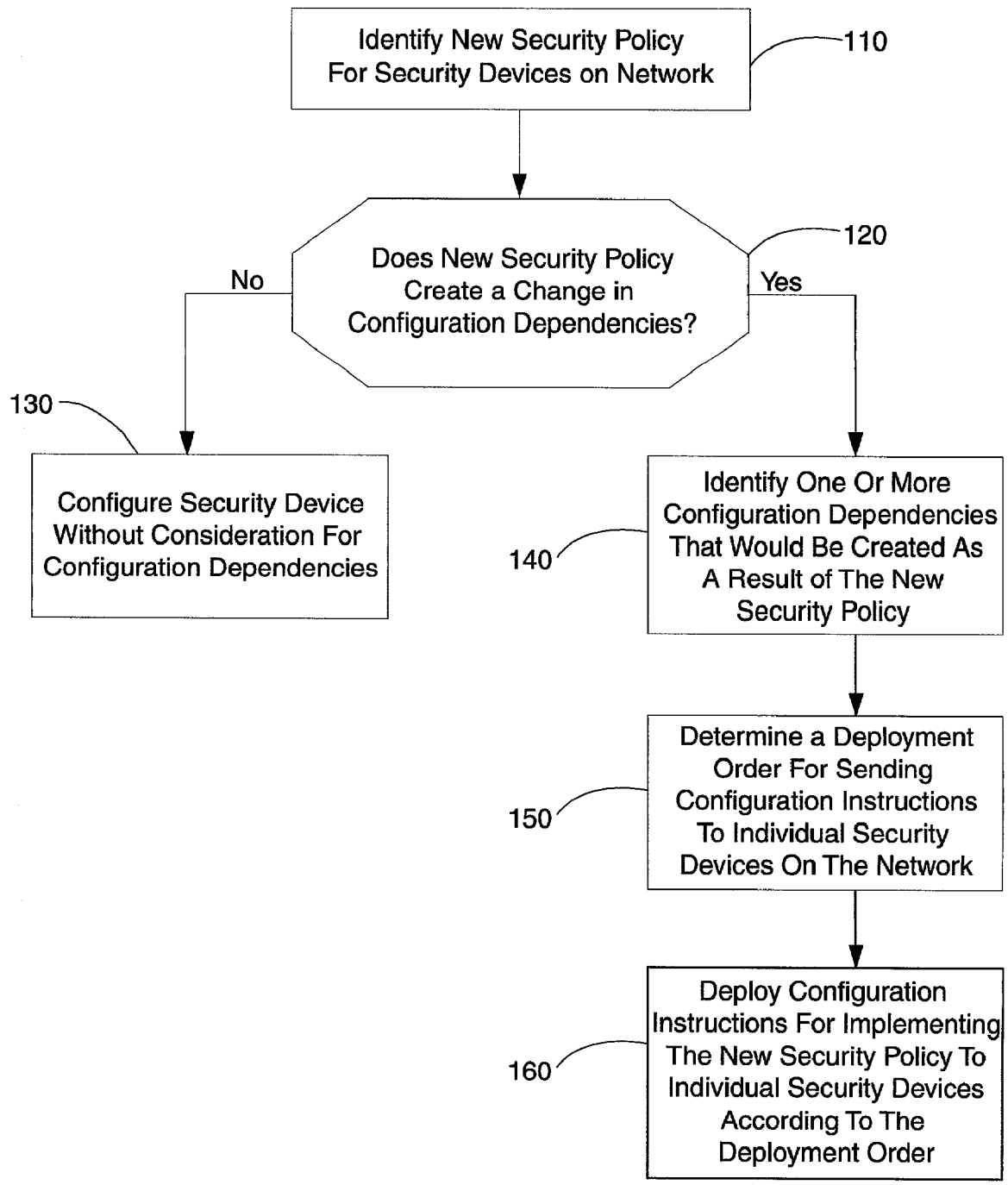
FIG. 1 is a flow diagram that illustrates a method for deploying configuration instructions to security devices on a network.

A method and apparatus for deploying configuration instructions to a plurality of security devices in order to implement a security policy on a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
2.0 METHODOLOGY FOR DEPLOYING CONFIGURATION INSTRUCTIONS TO SECURITY DEVICES
3.0 ADDRESS TRANSLATIONS ON NETWORK PATHS
4.0 PARALLEL DEPLOYMENT OF CONFIGURATION INSTRUCTIONS
5.0 IMPLEMENTATION MECHANISMS-HARDWARE OVERVIEW
6.0 EXTENSIONS AND ALTERNATIVES

1.0 Overview

According to one embodiment, implementation of a security policy is detected in the form of one or more operations causing an address translation alteration in data packets that are communicated between a management source and one or more security devices. One or more sets of security devices are identified that would each have one or more configuration dependencies as a result of the address translation alteration, if the security policy is implemented. Configuration instructions are sent from the management source to each of the one or more sets of security devices using an order that is determined based on the identified configuration dependencies. The configuration instructions are used to implement the security policy on the network.

As used herein, a "management source" is a policy server, or other computer readable-medium capable of sending instructions to the security devices. In one example, a workstation may access a repository to send out configuration instructions to the security devices over the network. A "security device" refers to any module, device or component of a network that screens or regulates packet traffic.

The term "configuration dependency" means that the configuration of one security device is dependent on another security device being configured or not configured. By way of example, a configuration dependency corresponds to a first security device having to receive its configuration instructions before a second security device is configured, else the second security device would block the configuration instructions to the first security device.

In one aspect, configuration instructions are sent from the management source to each of the one or more sets of security devices in parallel, for purpose of implementing the security policy on the network. As used herein, the term "in parallel" means at one time or nearly simultaneously. Two security devices that are configured in parallel means that the two security devices were configured independent of one another. The term "set" refers to one or more.

Using the approaches disclosed herein, a new set of configuration instructions may be implemented for security devices on a network without risk that some newly configured security devices will block other security devices from receiving their respective configuration instructions. Further, a new set of configuration instructions may be deployed according to a schedule. The schedule may permit one group of security devices to be configured in parallel with another group of security devices, based on a determination that the one group of security devices is not dependent on the other group of security devices when receiving configuration instructions from a management host. Use of the schedule enables multiple security devices to be configured in parallel across large networks, thereby reducing the time it takes to implement a new security policy on that network.

2.0 Methodology for Deploying Configuration Instructions to Security Devices FIG. 1 illustrates a method for deploying configuration instructions to security devices on a network. The configuration instructions may be used to configure the security devices for the purpose of implementing or updating a security policy.

In step 110, a new security policy is identified for the security devices that are in a network. The new security policy may require the security devices of the network to be individually configured with configuration instructions sent from a management source. Block 110 may involve an administrator determining that a new security policy is needed in the network, or it may involve a software element determining that a new security policy needs to be deployed to the network, automatically or based on user input.

In step 120, a determination is made as to whether the new security policy creates a change in configuration dependencies on the network, as compared with an old or existing security policy on the network. Each configuration dependency may correspond to a security device that must receive its configuration instructions before another security device is configured. As will be discussed, configuration dependencies may be created as a result of utilizing a device or other mechanism that performs an address translation on the network. For example, the new security policy may require that a network address translator be positioned between the management source and one of a series of security devices forming a network path.

If the determination in step 120 is negative, then in step 130, security devices on the network are configured to implement the new security policy without consideration for configuration dependencies. No new sequence for deploying configuration instructions to the security devices is necessary. Step 130 may be carried out, for example, by issuing appropriate configuration commands using SNMP, or a similar protocol, from a management station that is executing a network security policy management application. An example of such an application is Cisco Secure Policy Manager, from Cisco Systems, Inc., San Jose, Calif.

If the determination in step 120 is positive, then in step 140, one or more configuration dependencies, which would be created as a result of implementing the new security policy, are identified. Sets of security devices that form network paths containing the one or more configuration dependencies may be identified. Information identifying the sets may be stored in memory.

In step 150, the identified configuration dependencies are used to determine a deployment order for sending configuration instructions to individual security devices on the network when implementing the new security policy. The deployment order ensures that security devices that are part of the one or more configuration dependencies are configured in a successful sequence. The deployment order may also specify that one or more security devices are to be configured at the same time, so as to configure multiple security devices in parallel. The deployment order may comprise an ordered list of devices or sets of devices as determined in step 140.

In step 160, configuration instructions for implementing the new security policy are deployed to individual security devices, according to the deployment order determined in step 150. Deployment may occur to individual devices or to the sets of devices that were determined in step 140.

Figure 2:
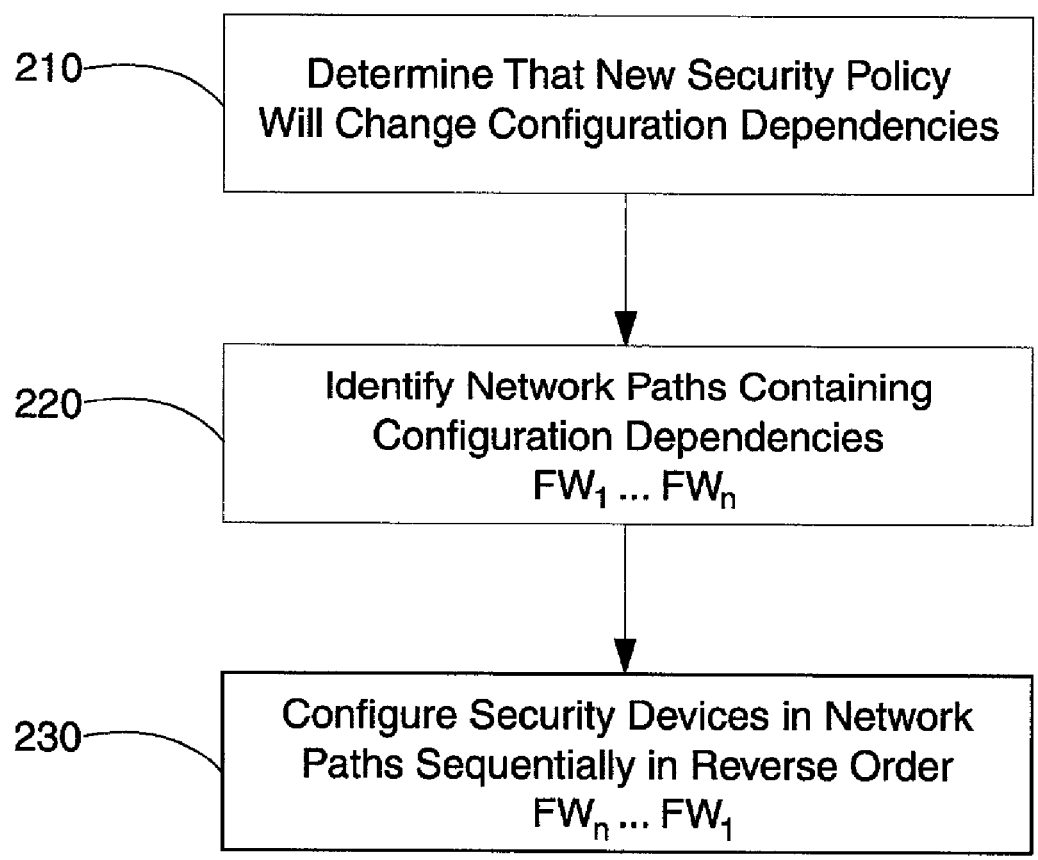
FIG. 2 is a flow diagram that illustrates a method for identifying a sequence for deploying configuration instructions to a set of security devices on a network path containing an address translation.

FIG. 2 illustrates a method for identifying a deployment order for sending configuration instructions to a set of security devices on a network path containing an address translation. FIG. 2 represents a more detailed view of sub-steps that can be carried out as part of steps 120, 140, 150 of FIG. 1.

In step 210, a determination is made that implementation of a new security policy will cause an address translation alteration on packets that flow through the devices. The presence of a device performing an address translation in between the management source and the sequence of security devices receiving the configuration instructions may create configuration dependencies. As a result, the configuration instructions may have to be deployed in a designated order so that each of the security devices can receive and process those configuration instructions. Specific examples of address translations and resulting configuration dependencies is described and illustrated with FIG. 3, FIG. 4 and FIG. 5.

In an embodiment, an address translation corresponds to a device that performs a (i) a static network address translation (NAT), (ii) a hiding NAT, (iii) a reverse static NAT, or (iv) a tunneling translation. For each type of address translation, an address translation alteration corresponds to a device that (i) adds an address translation with a new security policy when no address translation existed with the old security policy, (ii) deletes an address translation that existed with the old security policy, and (iii) implements a new address translation with a new security policy when the old security policy had a different address translation.

In an embodiment, an address translation alteration may be performed by a device, such as a firewall, that implements one or more rules that correspond to the address translation alterations. For example, the addition of an address translation may be the result of configuring a firewall to execute a new rule corresponding to that address translation. Similarly, the deletion of an address translation may be the result of configuring a firewall to delete, modify or supplement an existing rule that was executed to perform the address translation.

In step 220, one or more network paths containing configuration dependencies are identified. In an embodiment, step 220 involves identifying paths having an origin at the device where the address translation alteration takes place. For any one identified network path, the ability of one or more security devices, referred to as "dependent security devices", to receive configuration instructions will depend on whether other security devices on those same network paths are configured or not configured. Each dependent security device is part of a configuration dependency that results from the address translation alteration.

For example, a network path may contain a set of security devices aligned in series, designated $FW_1 \ldots FW_n$, where $FW_1$ is the security device that is adjacent to the address translation alteration. In this scenario, other security devices downstream from $FW_1$ may be dependent on $FW_1$. In some cases, other security devices downstream from $FW_1$ may be dependent on $FW_1$ and intermediate security devices.

In step 230, security devices in each network path are configured in a reverse (or last-first) order or sequence. In a reverse order, the last security device on the network path is configured first, sequentially followed by other security devices on the network path, until the security device adjacent to the address translation alteration is configured. The last security device corresponds to the last security device in the series to receive its configuration instructions from the management source. In the example provided, the deployment order for the set of security devices on that network path would be: $FW_n \ldots FW_1$, with the left position being the starting point.

Other embodiments may use other orders or sequences to deploy configuration instructions to dependent security devices. In addition, the devices that form the address translation alteration, and which are between the management source and the address translation alteration, may also be part of the determined order. For example, in the tunneling translation described with FIG. 5, the two firewalls used to form the tunneling translation are configured in a last-first order, relative to the management source.

3.0 Address Translations on Network Paths

Figure 3:
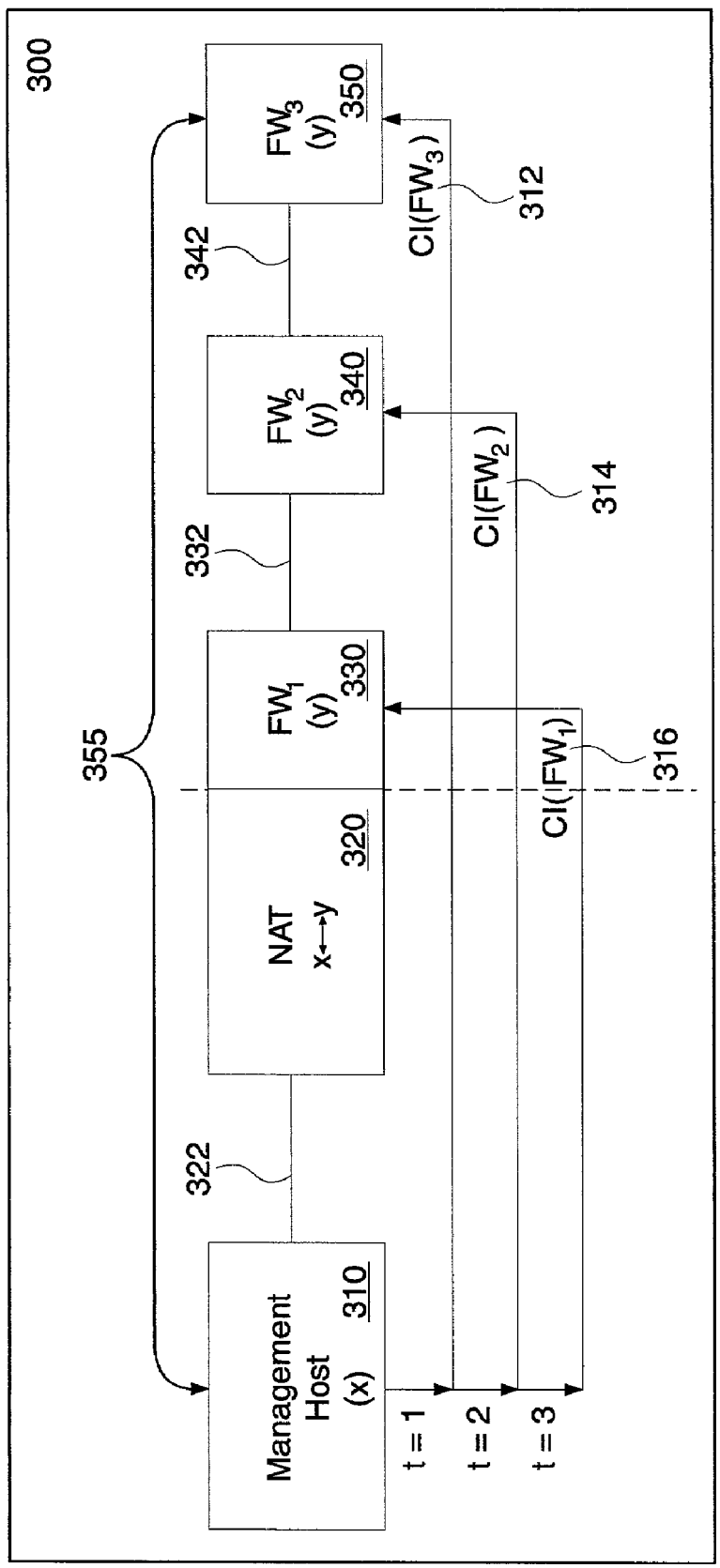
FIG. 3 is a block diagram that illustrates a system for configuring security devices on a network having a new natural address translation component.
Figure 4:
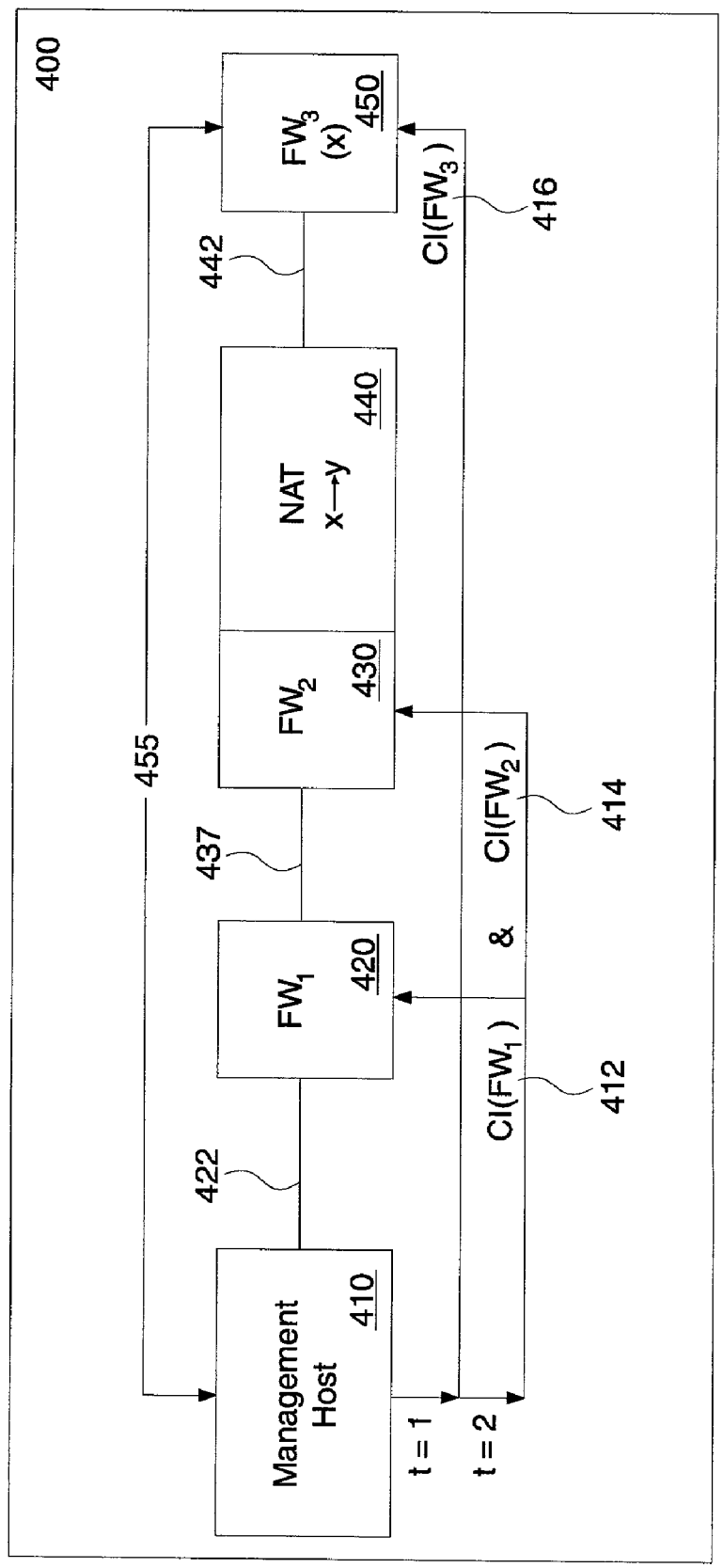
FIG. 4 is a block diagram that illustrates a system for configuring security devices on a network having a new reverse static natural address translation component.
Figure 5:
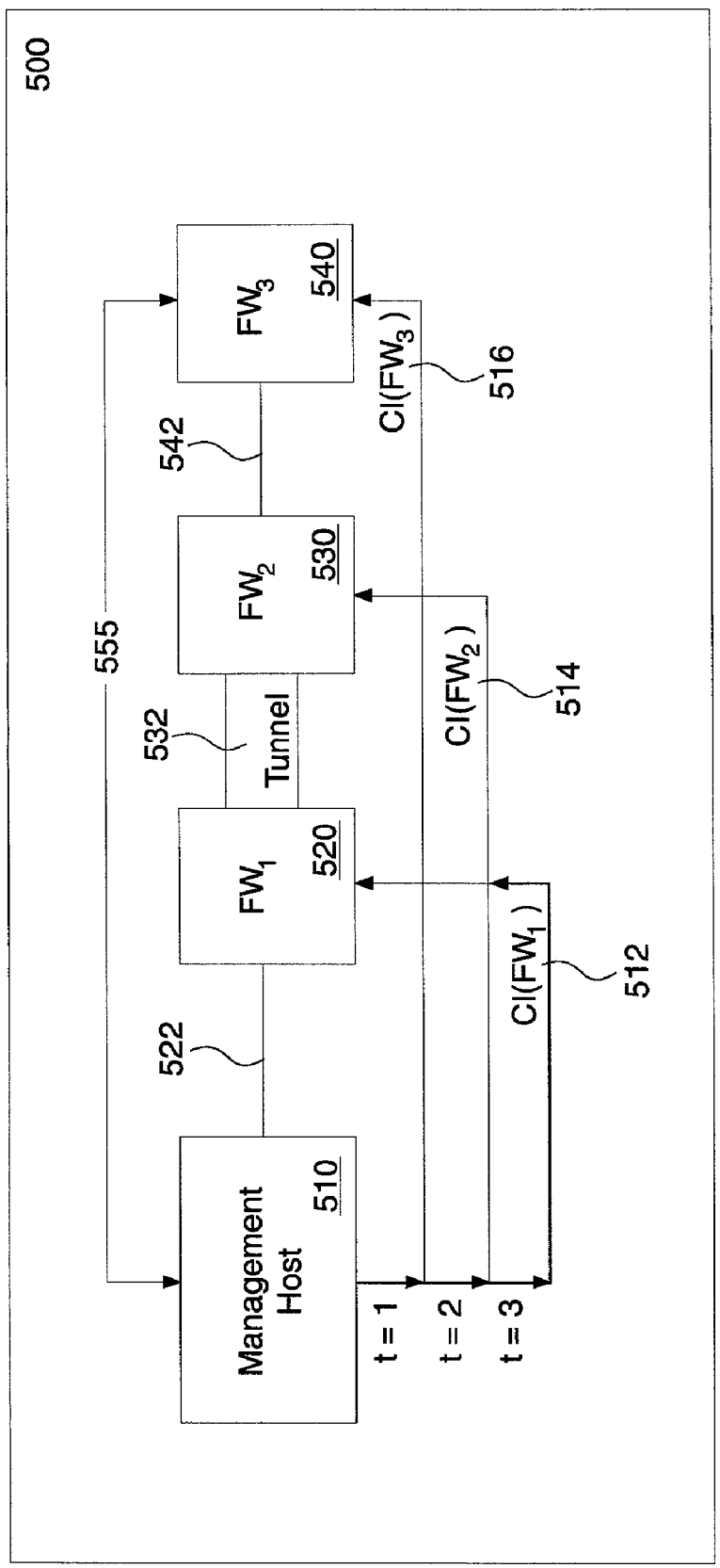
FIG. 5 is a block diagram that illustrates a system for configuring security devices on a network having a new tunneling translation component.
Figure 6:
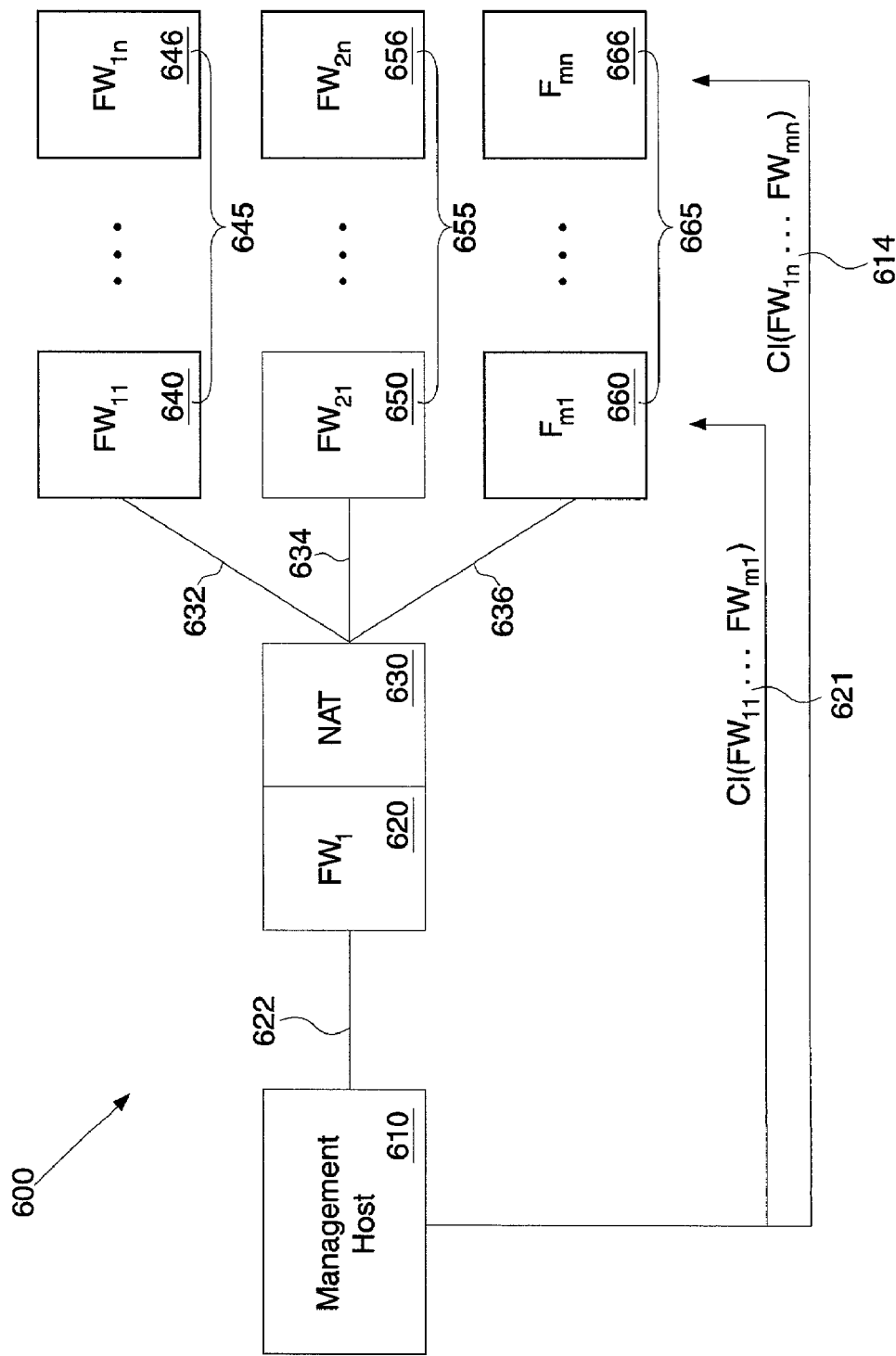
FIG. 6 is a block diagram that illustrates an embodiment for deploying configuration instructions to multiple sets of dependent security devices in parallel.

FIG. 3 is a block diagram that illustrates a system for configuring security devices on a network having a new natural address translation component. FIG. 4 is a block diagram that illustrates a system for configuring security devices on a network having a new reverse static natural address translation component. FIG. 5 is a block diagram that illustrates a system for configuring security devices on a network having a new tunneling translation component. FIG. 6 is a block diagram that illustrates an embodiment for deploying configuration instructions to multiple sets of dependent security devices in parallel. Thus, FIGS. 3–6 illustrate networks in which a management host implements a new security policy on a plurality of firewalls, where the new security policy also implements an intervening address translation between the management host and one or more of the plurality of security devices.

Each management host described in FIGS. 3–6 may be assumed to be part of a centralized management scheme. Furthermore, each management host described in FIGS. 3–6 may be assumed to deploy configuration instructions using a permit management property. For purpose of explanation, each address translation alteration discussed in FIGS. 3–6 is also assumed to be an addition. Embodiments of the invention are also intended to include modifications and deletions of address translations from a network path.

FIG. 3 illustrates a system for configuring security devices on a network having a new network address translation (NAT) component. In FIG. 3, a management host 310 is connected on network 300 to a first firewall 330, second firewall 340, and third firewall 350. The first firewall 330, second firewall 340 and third firewall 350 are positioned in series, such that first firewall 330 is the closest to the management host 310, and third firewall 350 is furthest from the management host 310.

A NAT component 320 is positioned to intercept communications sent from management host 310 to first firewall 330. A first channel 322 connects the management host 310 to the NAT component 320, so that the NAT component and management host are logically adjacent to one another. The NAT component 320 may be a configuration, software element or module of first firewall 330. For example, one or more rules may be executed by the first firewall in order to carry out the network address translation functions of NAT 320. A second channel 332 connects the first firewall 330 to a second firewall 340, so that the first and second fireballs are logically adjacent to one another. A third channel 342 connects a third firewall 350 to the second firewall 340. The NAT 320, first firewall 330, second firewall 340 and third firewall 350 are arranged in a logical network path 355.

Each data packet received by NAT component 320 includes a source address identifier that is altered by the NAT component. The NAT component 320 converts the source address identifier into a new source address identifier for components that are downstream from the NAT along network path 355.

In a typical scenario, the NAT component 320 is used to translate a limited set of exterior Internet Protocol (IP) addresses into a greater set of interior or local IP addresses. Two configurations are possible for using NAT component 320. The NAT component 320 may be utilized for either static or hiding type network address translation. In static network address translation, one interior local address is mapped to a corresponding (IP) address, or other exterior address. In hiding network address translation, multiple interior network addresses are mapped to one or more exterior IP addresses, or other exterior addresses. There are many instances in which NAT component 320 may be employed. For example, NAT component 320 may be used to enable an Internet Service Provider to translates a limited number of exterior addresses into a large number of interior addresses, thereby giving many users access to the Internet while using only a limited supply of IP addresses. As another component, NAT component 320 may be used to hide identification information from traffic leaving the local portion of network 300. Further, hiding type NAT enables a local network to hide the actual addresses of local network devices from external network elements, while enabling packets to be routed to the local network devices.

The management host 310 can send configuration instructions to each of the first firewall 330, second firewall 340, and third firewall 350 in order to implement a security policy on the network 300. The channels 322, 332 and 342 link first firewall 330, second firewall 340 and third firewall 350, respectively, to management host 310 in series. As such, configuration instructions sent from management host 310 to third firewall 350 must pass through first firewall 330 and second firewall 340.

The addition of NAT component 320 causes a new configuration dependency to form on network path 355. Configuration dependencies may cause deployment order problems when a new security policy is to be implemented on network 300. For example, NAT component 320 may be added as part of a new security policy that includes re-configuration of first firewall 330, second firewall 340, and third firewall 350. If the deployment order is ignored, then once NAT component 320 is added to network path 355, new configuration instructions sent from management host 310 to first firewall 330, second firewall 340 and/or third firewall 350 may be dropped rather than implemented. This can open the network up to a security breach, and under certain circumstances, cause network 300 to shut down.

The approaches herein address this possibility by enabling management host 310 to deploy configuration instructions for implementing a new security policy using a schedule, so that deployment order problems are avoided when NAT component 320 is added to network path 355. Approaches herein ensure correct deployment orders for when management host 310 sends configuration instructions to the firewalls on network path 355. Furthermore, on larger networks with multiple branches stemming from or passing through NAT component 320, configuration instructions may be sent to non-dependent firewalls simultaneously, or otherwise in parallel.

The addition of NAT 320 to network path 355 illustrates one type of configuration dependency that may arise. As an example, assume that addition of NAT component 320 causes data packets that contain internal address identifiers for a component X to identify a component Y instead. Under an existing configuration, the first firewall 330, second firewall 340 and third firewall 350 may be configured to receive data packets containing source address identifier X, but the new security policy will require that each of those firewalls receive data packets having a source identifier of Y, not X. If NAT component 320 is added to network path 355, but second firewall 340 and third firewall 350 are not configured, then the second and third firewalls are configured to receive data packets containing the source identifier X; however, the presence of NAT component 320 causes configuration instructions (and other traffic) sent from management host 310 to second firewall 340 or third firewall 350 to have source address identification component Y. Consequently, the configuration instructions sent to second and third firewalls 340 and 350 would be dropped, since those firewalls would be able to receive only data packets having the source address identifier X.

Similarly, if second firewall 340 is configured before third firewall 350, then the second firewall would drop all traffic, including configuration instructions, that passes through second firewall 340 directed to third firewall 350. Third firewall 350 requires such traffic to have X as its source address identifier component, but second firewall 340 would let only traffic having Y as its source address identifier component to be passed-through.

Accordingly, a first configuration dependency that exists on network path 355 from the addition of NAT component 320 is that third firewall 350 must receive configuration instructions that are forwarded from first firewall 330 and second firewall 340. Third firewall 350 would not be configurable if, for example, second firewall 340 was to drop its configuration instructions. A second configuration dependency that exists on network path 355 from the addition of NAT component 320 is that second firewall 340 must receive configuration instructions that are forwarded from first firewall 330. Therefore, second firewall 340 would not be configurable if first firewall 330 was to drop its configuration instructions from management device 310.

The approaches herein enable deploying configuration instructions from management host 310 to each firewall on network path 355 without dropping any of the instructions as a result of configuration dependencies on that network path. Specifically, embodiments determine an order for deploying configuration instructions that does not cause any device to drop configuration instructions as a consequence of the configuration dependencies.

In one embodiment shown by FIG. 1, configuration instructions $CI(FW_3)$ sent from management host 310 to third firewall 350 are sent first, at time t=1. At time t=2, configuration instructions $CI(FW_2)$ are sent to second firewall 340. Then at time t=3, configuration instructions $CI(FW_1)$ are sent to first firewall 330. The configuration instructions $CI(FW_1)$ may cause first firewall 330 to implement that NAT component 320. The result is that a last-first sequential deployment order is used to configure the series of firewalls on network path 355 using configuration instructions sent from management host 310.

In an embodiment, firewalls and other security devices on network path 355 may be configured using a schedule that controls the order in which configuration instructions are deployed. The schedule may specify that CI(FW$_3$) is to be deployed at t=1, CI(FW$_2$) is to be deployed at t=2, and CI(FW$_1$) is to be deployed at t=3. Moreover, the schedule may provide for security devices on other network paths (not shown) to be deployed in parallel. For example, management host 310 may deploy CI(FW$_3$) at the same time as CI(FW$_1$) on another network path (not shown) that stems from NAT component 320. Sending configuration instructions in parallel to firewalls and other security devices that are not dependent on one another saves time when a new security policy is to be implemented on the network.

FIG. 4 illustrates a system for configuring security devices on a network having a new, reverse static network address translation (NAT) component. In FIG. 4, a management host 410 is connected on network 400 to a first firewall 420, second firewall 430, and third firewall 450. The first firewall 420, second firewall 430 and third firewall 450 are positioned in series, such that the first firewall 420 is the closest to the management host 410, and the third firewall 450 is furthest from the management host 410. The second firewall 440 has a static NAT component 440 as a configuration, software module or other integrated component. The static NAT component 440 carries out address translation on packets communicated between second firewall 430 and third firewall 450. The static NAT component 440 is illustrated in a position that is reversed with respect to the position of NAT component 320 in relation to firewall 330 of FIG. 3, because management host 410 is external, and is seeking access to the internal components of a local network. The security devices on network path 455 screen incoming communications for a particular destination address identifier.

A first channel 422 connects the management host 410 to the first firewall 420. A second channel 432 connects the first firewall 420 to the second firewall 430 and static NAT component 440. A third channel 442 connects the second firewall 430 and static NAT component 440 to the third firewall 450, so as to form a logical network path 455.

The static NAT component 440 serves to convert address identification information in packets received from management host 410. In an example shown, destination address identification component X may be replaced with Y by static NAT component 440. In the presence of static NAT component 440, a destination address component of traffic directed to FW$_3$ is Y. In the absence of static NAT component 440, the destination address component of traffic to FW$_3$ is X.

A configuration such as that shown with FIG. 4 may be used when second firewall 430 and static NAT component 440 mark a boundary of a local network containing third firewall 450. Management host 410 may be external to the local network. The static NAT component 440 is used to hide the addresses of internal components of the local network to external devices, such as management host 410. The reverse static NAT component 440 precludes management host 410 from communicating with third firewall 450 using that firewall's actual address.

Certain configuration dependencies form on network path 455 after second firewall 430 is configured to include static NAT 440. As will be described, an example of a first dependency is that third firewall 450 must be configured before or after both first firewall 420 and second firewall 430.

For example, assume that management host 410 sends configuration instructions to first firewall 420, before configuring third firewall 450 and second firewall 430 to include static NAT 440. Then, a subsequent attempt to configure third firewall 450 would fail. First firewall 420 would expect the destination address component of third firewall to be Y, but third firewall 450 would expect its control instructions to specify a destination address of X. As a result, the configuration instructions to third firewall 450 would be dropped at either first firewall 420 or third firewall 450. A similar result would occur if the second firewall 420 is configured before third firewall 450, but first firewall 420 is configured after the third firewall.

Accordingly, network path 455 may be configured in one of two ways. First firewall 420 and second firewall 430 may be configured before third firewall 450, with configuration instructions sent from management host 410 for third firewall 450 identifying Y as a destination address component for the third firewall. Alternatively, third firewall 450 may be configured before first firewall 420 and second firewall 430, with configuration instructions sent from management host 410 for the third firewall identifying X as a destination address component for the third firewall.

A schedule to deploy configuration instructions may be used to efficiently configure the firewalls on network 455 while taking into account the configuration dependencies. As with other embodiments described, a last-first methodology may be employed to configure the firewalls on network path 455. At t=1, configuration instructions CI(FW$_3$) 416 are sent from management host 410 to third firewall 450. At t=2, configuration instructions CI(FW$_2$) 414 are sent from management host 410 to second firewall 430. At t=2 or at t=3, configuration instructions CI(FW$_1$) 412 are sent to first firewall 420.

FIG. 5 illustrates a system for configuring security devices on a network having a tunneling translation component. In FIG. 5, a management host 510 is connected on network 500 to a first firewall 520, second firewall 530, and third firewall 540. The first firewall 520, second firewall 530 and third firewall 540 are positioned in series, with the first firewall 520 being the closest to the management host 510, and the third firewall 540 being the furthest from the management host 510. A first channel 522 connects the management host 510 to the first firewall 520. A tunnel 532 is established between the first firewall 520 and the second firewall 530. A second channel connects the second firewall 530 to the third firewall 540. The first channel 522, second channel 542, and tunnel 532 serve to connect the first firewall 520, second firewall 530 and third firewall 540 in series, so as to form a network path 555.

The tunnel 532 encrypts, authenticates and performs other security measures for data packets passing from first firewall 520 to second firewall 530. In addition, tunnel 532 translates both source and destination address components of traffic passing through the tunnel. Since this traffic would include configuration instructions passing from management component 510 to third firewall 540, configuration dependencies are formed on network path 555 when new security policies are implemented.

One configuration dependency in the presence of tunnel 532 is that firewalls on one side of the tunnel should all be configured before firewalls on another side of the tunnel. For example, in FIG. 3, first firewall 520 and second firewall 530 should both be configured before the third firewall 540. Alternatively, the third firewall 540 should be configured before both the first firewall 520 and the second firewall 530. If the first firewall 520 is configured before the third firewall 540, and the second firewall 530 is not yet configured when third firewall component 540 is to be configured, then first firewall 520 would drive the configuration instructions for the third firewall into the tunnel 532, but second firewall 530 would not be able to retrieve those configuration instructions. The same result would occur if second firewall 530 is configured before first firewall 520 is configured, and an attempt to configure third firewall 540 occurred.

Accordingly, in the approaches herein, when a tunnel is connecting two firewalls on a network path, both of the two firewalls are configured either before or after the other firewalls on the network path. In FIG. 5, first firewall 520 and second firewall 530 are configured either before or after third firewall 540.

As with other embodiments, a last-first deployment order is performed when tunnel 532 is employed on network path 555. A schedule may provide that at t=1, configuration instructions CI(FW$_3$) 516 are sent to third firewall 540. Next, at t=2, configuration instructions CI(FW$_2$) 514 are sent to second firewall 530. At t=2 or 3, configuration instructions CI(FW$_1$) 512 are sent to first firewall 520. Thus, some parallelism may be employed in that CI(FW$_2$) 514 and CI(FW$_1$) 512 may be sent at the same time from management host 510 to the respective firewalls.

4.0 Parallel Deployment of Configuration Instructions

FIG. 6 illustrates an embodiment for deploying configuration instructions to multiple sets of dependent security devices in parallel. In an embodiment, each dependent set of security devices refers to a network path having at least one configuration dependency, where one security device can only receive configuration instructions if another security device is configured or not configured. For purpose of explanation, a single natural address translation is described.

In FIG. 6, a network 600 includes a management host 610 connected to a first firewall 620 via a channel 612. A NAT component 630 is configured with first firewall 620. A first channel 622 connects first firewall 620 to management host 610.

In the example provided, a first network path 645, second network path 655, and third network path 665 each stem from NAT component 630. Each of the network paths includes at least one firewall adjacent to NAT component 630. First network path 645 includes firewall 640 (FW$_{1l}$) connected to NAT component 630 via channel 632. Second network path 655 includes firewall 650 (FW$_{2l}$) connected to NAT component via channel 634. Third network path 665 includes firewall 660 (FW$_{ml}$) that connects to NAT component 630 via third channel 636.

Each network path 645, 655 and 665 includes a last firewall. For example, first network path 645 includes last firewall 646 (FW$_{1n}$), second network path 655 includes last firewall 656 (FW$_{2n}$), and third network path 665 includes last firewall 666 (FW$_{mn}$). The last firewall corresponds to the last one of the firewalls on the respective firewalls to receive configuration instructions from the management host in series.

When the address translation alteration is caused by the addition of NAT component 630, configuration dependencies are created downstream from the NAT component, along the first, second and third network paths. For example, for each network path, the last firewall is dependent on the upstream firewall adjacent to NAT component 630 for its configuration instructions.

In one embodiment, configuration instructions are deployed to the firewalls on the first, second and third network paths 645, 655, 665, using a last-first order. On first network path 645, last firewall 646 (FW$_{1n}$) receives its configuration instructions before the firewall 640 (FW$_{1l}$). On second network path 655, last firewall 656 (FW$_{2n}$) receives its configuration instructions before firewall 650 (FW$_{2l}$). And on third network path 665, last firewall 666 (FW$_{mn}$) receives its configuration instructions before firewall 660 (FW$_{ml}$). Intermediate firewalls between the NAT component 630 and the last firewalls 646, 656 and 666 on respective network paths 645, 655 and 665 also receive configuration instructions in the last-first order.

Each network path 645, 655, 665 is independent of the other network paths for receiving configuration instructions from management host. This is because NAT component 630 communicates with adjacent firewalls of the respective network paths directly. As a result, configuration instructions to each network path 645, 655 and 665 may be deployed in parallel.

In one embodiment, configuration instructions 614 that are issued to the last firewalls 646, 656, 666 are sent together, at t=0. Still further, an embodiment provides that at another time interval, configuration instructions for the next-to-last firewall on each respective network path is deployed. If each network path 645, 655, 665 is assumed to have the same number of firewalls, then configuration instructions 621 to the respective adjacent firewalls 640, 650, 660 are deployed together, at some time t=i.

FIG. 6 illustrates one example of parallel deployment of configuration instructions to firewalls on network paths. Other examples may be provided. For example, in FIG. 5, if another firewall is added in series with third firewall 540, then that configuration instructions to that firewall, and to the third firewall 540 may be deployed in parallel. Therefore, in some scenarios, configuration instructions may be deployed to firewalls aligned in series on the same network path.

5.0 Implementation Mechanisms—Hardware Overview

Figure 7:
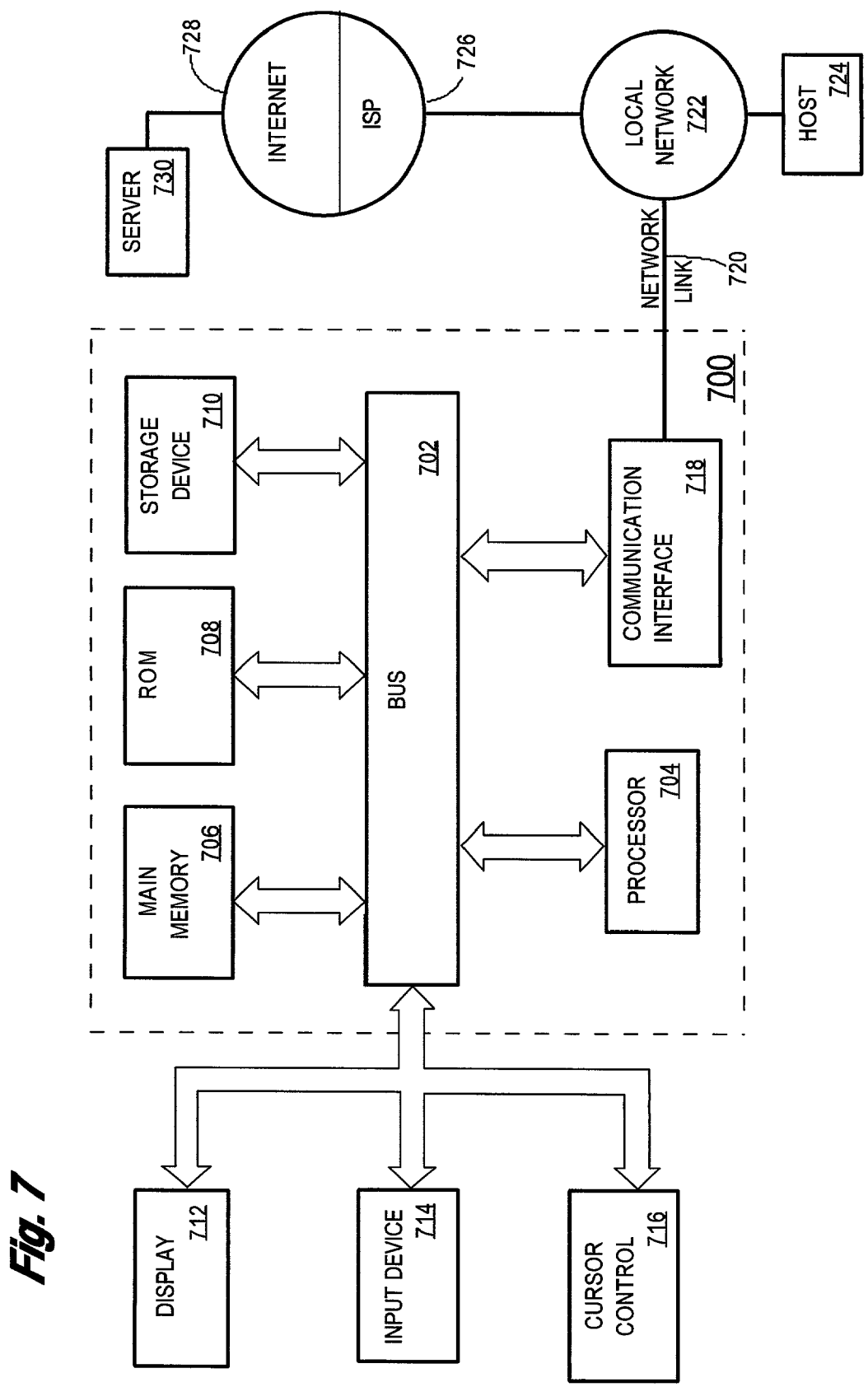
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for deploying configuration instructions to a plurality of security devices in order to implement a security policy on a network is described. According to one embodiment of the invention, deploying configuration instructions to a plurality of security devices in order to implement a security policy on a network is described is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for deploying configuration instructions to a plurality of security devices in order to implement a security policy on a network is described, as described herein.

The received code may be executed by processor 704 as it is received, and/or stored in storage device 710, or other non-volatile storage for later execution. In this manner, computer system 700 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for deploying configuration instructions to security devices in order to implement a security policy in a network, the method comprising the computer-implemented steps of:

detecting that implementing a security policy will cause an address translation alteration in a packet communicated between a management source and a plurality of security devices for implementing the security policy on the network;

identifying, from among the plurality of security devices, one or more sets of security devices that have one or more configuration dependencies as a result of the address translation alteration if the security policy is implemented; and sending one or more configuration instructions from the management source to each of the one or more sets of security devices using an order that is determined based on the one or more configuration dependencies, resulting in implementing the security policy on the network.

2. A method as recited in claim 1, wherein sending configuration instructions from the management source to the one or more sets of security devices includes sending configuration instructions to multiple sets of security devices in parallel, wherein each of the multiple sets of security devices includes one or more configuration dependencies.

3. A method as recited in claim 2, wherein:

identifying one or more sets of security devices that would each have one or more configuration dependencies as a result of the address translation alteration includes identifying a first network path that interconnects the management source and a first set of the one or more security devices in series, and a second network path that interconnects the management source and a second set of the one or more security devices in series; and sending configuration instructions to multiple sets of security devices in parallel includes sending configuration instructions to one or more security devices on the first network path and on the second network path concurrently, and independently of one another, using the order determined by the one or more configuration dependencies.

4. A method as recited in claim 1, wherein:

identifying one or more sets of security devices that would each have one or more configuration dependencies as a result of the address translation alteration includes identifying a first network path that interconnects the management source and a first set of the one or more security devices in series, and a second network path that interconnects the management source and a second set of the one or more security devices in series;

sending configuration instructions from the management source to each of the one or more sets of security devices includes sending configuration instructions to one or more security devices on the first network path and on the second network path in parallel; and sending configuration instructions to one or more security devices on the first network path includes sending configuration instructions to at least some of the security devices on the first network path sequentially, beginning with a first security device on the first network path that is ordered to be a last one of the security devices on the first network path to receive communications from the management source.

5. A method as recited in claim 1, wherein:

detecting that implementing the security policy will cause an address translation alteration between a management source and a plurality of security devices includes detecting that implementing the security policy will cause a natural address translation between the management source and one of the plurality of security devices.

6. The method as recited in claim 1, wherein:

detecting that implementing the security policy will cause an address translation alteration between a management source and a plurality of security devices includes detecting that implementing the security policy will cause a static address translation between the management source and one of the plurality of security devices.

7. A method as recited in claim 1, wherein:

detecting that implementing the security policy will cause an address translation alteration between a management source and a plurality of security devices includes detecting that implementing the security policy will cause a tunneling translation between the management source and one of the plurality of security devices.

8. A method as recited in claim 1, wherein:

detecting that implementing the security policy will cause an address translation alteration between a management source and a plurality of security devices includes detecting that implementing the security policy will cause a natural address translation;

identifying one or more sets of security devices that would each have one or more configuration dependencies as a result of the address translation alteration includes identifying a first network path that interconnects the management source and a first set of the one or more security devices in series; and sending configuration instructions from the management source to one or more sets of security devices includes sending configuration instructions to at least some of the security devices on the first network sequentially, beginning with a first security device on the first network path that is ordered to be a last one of the security devices on the first network path to receive communications from the management source.

9. A method as recited in claim 1, wherein:

detecting that implementing the security policy will cause an address translation alteration between a management source and a plurality of security devices includes detecting that implementing the security policy will cause a static address translation on the first network path; and identifying one or more sets of security devices that would each have one or more configuration dependencies as a result of the address translation alteration includes identifying a first network path that interconnects the management source and a first set of the one or more security devices in series;

sending configuration instructions from the management source to one or more sets of security devices includes sending configuration instructions to one or more security devices on the first network path using the order of either (i) sending configuration instructions to each security device of the first network path that is ordered in series between the management source and the static address translation before sending configuration instructions from the management source to any of the other security devices that are ordered in series after the static address translation, or (ii) sending configuration instructions to all of the other security devices that are ordered in series after the static address translation before sending configuration instructions from the management source to each security device that is ordered between the management source and the static address translation.

10. A method as recited in claim 1, wherein:

detecting that implementing the security policy will cause an address translation alteration between a management source and a plurality of security devices includes detecting that implementing the security policy will cause a tunneling translation on the first network path; and identifying one or more sets of security devices that would each have one or more configuration dependencies as a result of the address translation alteration includes identifying a first network path that interconnects the management source and a first set of the one or more security devices in series;

sending configuration instructions from the management source to one or more sets of security devices includes sending configuration instructions to one or more security devices on the first network path using the order of either (i) sending configuration instructions to each security device of the first network path that is ordered in series between the management source and the static address translation before sending configuration instructions from the management source to any of the other security devices that are ordered in series after the static translation, or (ii) sending configuration instructions to all of the other security devices that are ordered in series after the static translation before sending configuration instructions from the management source to each security device that is ordered between the management source and the tunneling translation.

11. A method for deploying configuration instructions to security devices in order to implement a security policy in a network, the method comprising the computer-implemented steps of:

detecting that the security policy creates a change of one or more configuration dependencies as compared with an existing security policy, each configuration dependency corresponding to at least a first security device having to be configured before a second security device is configured in order for the first security device to receive its configuration instructions for implementing the security policy from a management source; and deploying configuration instructions to one or more security devices to implement the security policy according to an order determined by the one or more configuration dependencies.

12. A method as recited in claim 11, wherein deploying configuration instructions includes deploying, for a network path containing at least a first configuration dependency of the one or more configuration dependencies, configuration instructions to a first security device of the first configuration dependency before deploying configuration instructions to a second security device of the first configuration dependency, wherein the first security device has to be configured before the second security device in order for the first security device to receive its configuration instructions for implementing the security policy from the management source.

13. A method as recited in claim 11, further comprising creating a schedule to implement the security policy to account for the change in the one or more configuration dependencies, and wherein deploying configuration instructions to one or more security devices includes using the schedule to deploy the configuration instructions.

14. A method as recited in claim 13, wherein deploying configuration instructions includes deploying in parallel the configuration instructions to each of the first security devices in the one or more configuration dependencies.

15. A method as recited in claim 11, wherein detecting that the security policy creates a change of one or more configuration dependencies from an existing security policy includes detecting the addition, deletion or modification of an address translation in a network path between the one or more security devices and the policy manager.

16. A method as recited in claim 14, further comprising detecting the addition, deletion or modification of the address translation selected from an address translation type consisting of a natural address translation type, a reverse address translation type, and a tunnel translation.

17. A computer-readable medium for deploying configuration instructions to security devices in order to implement a security policy in a network, the computer-readable medium carrying instructions for implementing the steps of:

detecting that implementing a security policy will cause an address translation alteration in a packet communicated between a management source and a plurality of security devices for implementing the security policy on the network;

identifying, from among the plurality of security devices, one or more sets of security devices that have one or more configuration dependencies as a result of the address translation alteration if the security device is implemented; and sending one or more configuration instructions from the management source to each of the one or more sets of security devices using an order that is determined based on the one or more configuration dependencies, resulting in implementing the security policy on the network.

18. A computer-readable medium as recited in claim 17, wherein instructions for sending one or more configuration instructions from the management source to each of the one or more sets of security devices include instructions for sending configuration instructions to multiple sets of security devices in parallel, wherein each of the multiple sets of security devices includes one or more configuration dependencies.

19. A computer-readable medium as recited in claim 18, wherein:

instructions for identifying one or more sets of security devices that would each have one or more configuration dependencies as a result of the address translation alteration include instructions for identifying a first network path that interconnects the management source and a first set of the one or more security devices in series, and a second network path that interconnects the management source and a second set of the one or more security devices in series; and instructions for sending one or more configuration instructions to multiple sets of security devices in parallel include instructions for sending configuration instructions to one or more security devices on the first network path and on the second network path concurrently, and independently of one another.

20. A computer-readable medium as recited in claim 17, wherein:

instructions for identifying one or more sets of security devices that would each have one or more configuration dependencies as a result of the address translation alteration include instructions for identifying a first network path that interconnects the management source and a first set of the one or more security devices in series, and a second network path that interconnects the management source and a second set of the one or more security devices in series;

instructions for sending one or more configuration instructions from the management source to each of the one or more sets of security devices 1 include sending configuration instructions to one or more security devices on the first network path and on the second network path in parallel, including for sending configuration instructions to at least some of the security devices on the first network path sequentially, beginning with a first security device on the first network path that is ordered to be a last one of the security devices on the first network path to receive communications from the management source.

21. A computer-readable medium as recited in claim 17, wherein:

instructions for detecting that implementing the security policy will cause an address translation alteration between a management source and a plurality of security devices include instructions for detecting that implementing the security policy will cause a natural address translation between the management source and one of the plurality of security devices.

22. The computer-readable medium as recited in claim 17, wherein:
instructions for detecting that implementing the security policy will cause an address translation alteration between a management source and a plurality of security devices include instructions for detecting that implementing the security policy will cause a static address translation between the management source and one of the plurality of security devices.

23. A computer-readable medium as recited in claim 17, wherein:
instructions for detecting that implementing the security policy will cause an address translation alteration between a management source and a plurality of security devices include instructions for detecting that implementing the security policy will cause a tunneling translation between the management source and one of the plurality of security devices.

24. A computer-readable medium as recited in claim 17, wherein:
instructions for detecting that implementing the security policy will cause an address translation alteration between a management source and a plurality of security devices include instructions for detecting that implementing the security policy will cause a natural address translation;
instructions for identifying one or more sets of security devices that would each have one or more configuration dependencies as a result of the address translation alteration include instructions for identifying a first network path that interconnects the management source and a first set of the one or more security devices in series; and
instructions for sending one or more configuration instructions from the management source to one or more sets of security devices include instructions for sending configuration instructions to at least some of the security devices on the first network sequentially, beginning with a first security device on the first network path that is ordered to be a last one of the security devices on the first network path to receive communications from the management source.

25. A computer-readable medium as recited in claim 17, wherein:
instructions for detecting that implementing the security policy will cause an address translation alteration between a management source and a plurality of security devices include instructions for detecting that implementing the security policy will cause a static address translation on the first network path;
instructions for identifying one or more sets of security devices that would each have one or more configuration dependencies as a result of the address translation alteration include instructions for identifying a first network path that interconnects the management source and a first set of the one or more security devices in series; and
instructions for sending configuration instructions from the management source to one or more sets of security devices include instructions for sending configuration instructions to one or more security devices on the first network path using the order of either (i) sending configuration instructions to each security device of the first network path that is ordered in series between the management source and the static address translation before sending configuration instructions from the management source to any of the other security devices that are ordered in series after the static address translation, or (ii) sending configuration instructions to all of the other security devices that are ordered in series after the static address translation before sending configuration instructions from the management source to each security device that is ordered between the management source and the static address translation.

26. A computer-readable medium as recited in claim 17, wherein:
instructions for detecting that implementing the security policy will cause an address translation alteration between a management source and a plurality of security devices include instructions for detecting that implementing the security policy will cause a tunneling translation on the first network path;
instructions for identifying one or more sets of security devices that would each have one or more configuration dependencies as a result of the address translation alteration include instructions for identifying a first network path that interconnects the management source and a first set of the one or more security devices in series; and
instructions for configuration instructions from the management source to one or more sets of security devices include instructions for sending configuration instructions to one or more security devices on the first network path using the order of either (i) sending configuration instructions to each security device of the first network path that is ordered in series between the management source and the static address translation before sending configuration instructions from the management source to any of the other security devices that are ordered in series after the static translation, or (ii) sending configuration instructions to all of the other security devices that are ordered in series after the static translation before sending configuration instructions from the management source to each security device that is ordered between the management source and the tunneling translation.

27. A computer system for deploying configuration instructions to security devices in order to implement a security policy in a network, the computer system comprising:
means for detecting that implementing the security policy will cause an address translation alteration between a management source and a plurality of security devices for implementing the security device on the network;
means for identifying, from the plurality of security devices, one or more sets of security devices that would each have one or more configuration dependencies as a result of the address translation alteration; and
means for sending configuration instructions from the management source to each of the one or more sets of security devices in order to implement the security policy.

28. A management device for deploying configuration instructions to a plurality of security devices in order to implement a security policy on a network, the management device comprising:
a processor configured to:
detect that implementing the security policy will cause an address translation alteration between a management source and a plurality of security devices for implementing the security device on the network;

identify, from the plurality of security devices, one or more sets of security devices that would each have one or more configuration dependencies as a result of the address translation alteration; and send configuration instructions from the management source to each of the one or more sets of security devices using an order that is determined by the one or more configuration dependencies, so as to implement the security policy on the network.

* * * * *